April 16, 1935.  A. J. WALTER, JR  1,998,109
CONVEYING MECHANISM
Filed Nov. 22, 1933   5 Sheets-Sheet 1

INVENTOR
A. Judson Walter Jr.
BY
ATTORNEY

April 16, 1935. A. J. WALTER, JR 1,998,109
CONVEYING MECHANISM
Filed Nov. 22, 1933 5 Sheets-Sheet 3

INVENTOR
A. Judson Walter Jr.
BY
ATTORNEY

April 16, 1935. A. J. WALTER, JR 1,998,109
CONVEYING MECHANISM
Filed Nov. 22, 1933 5 Sheets-Sheet 4

INVENTOR
A. Judson Walter Jr.
BY
ATTORNEY

April 16, 1935. A. J. WALTER, JR 1,998,109
CONVEYING MECHANISM
Filed Nov. 22, 1933 5 Sheets-Sheet 5

INVENTOR
A. Judson Walter Jr.
BY
ATTORNEY

UNITED STATES PATENT OFFICE 1,998,109

CONVEYING MECHANISM

Andrew Judson Walter, Jr., North Hackensack, N. J., assignor to Fowler Machinery & Equipment Corporation, New York, N. Y., a corporation of New York Application November 22, 1933, Serial No. 699,239

20 Claims. (Cl. 211—1.5)

This invention relates to conveying mechanisms and more particularly refers to improvements in conveying mechanisms consisting of a plurality of carriers having means for automatically transferring articles from one carrier to another at predetermined times. The invention also refers to improvements in conveying devices, such as are used for successively displaying articles for sale, especially garments and the like, where the garments are suspended from a carrier and are transferred therefrom at spaced intervals onto a travelling carrier and thence to a display holder, adapted to display the articles in two different positions, and back again onto the travelling carrier.

The primary object of the present invention is to provide a conveyor for display and like purposes, consisting of an entirely self-contained structure of great compactness and simplicity, adapted to be produced at relatively low cost.

Another object is to provide in a device of the character mentioned, novel and improved means for automatically transferring articles from one carrier to another, said means being actuated entirely by the movement of the display carrier without the intermediary of additional actuating or controlling devices.

A further object is to provide in a conveying mechanism, where articles, which have to be carried along a given path by a travelling carrier, can be suspended at random from a feeding carrier and are thereby automatically transferred to the travelling carrier at regularly spaced intervals.

A still further object is to provide a display conveyor of a novel and improved construction, including in combination with a feeding or distributing carrier and a travelling carrier, means cooperating with said travelling carrier for displaying articles in two different positions, while said articles are held stationary in each position, so as to permit careful examination thereof by on-lookers.

Other objects and advantages of the present invention will more fully appear as the description proceeds, and will be set forth and claimed in the appended claims.

A display conveyor representing one of the possible embodiments of my invention is illustrated by way of example in the accompanying drawings, in which.

The embodiment of my invention illustrated in the drawings is in the form of a display apparatus for articles, such as garments, and its general construction comprises a base structure, from which upwardly extend two uprights 30, 31, supporting a top structure B, carrying all the moving and operating parts of the apparatus.

The conveying apparatus proper consists of an endless chain 32, arranged to travel on a horizontal plane, a feeding or distributing rack mechanism C, constituting a magazine, from which are suspended the garment carrying hangers, which are individually fed at intervals to the travelling chain, a transfer mechanism D for conveying said hangers one by one from the point of discharge of the rack to the point of loading of the chain, a display mechanism E, comprising a non-travelling hanger holder for displaying garments in two different positions, a motor F, for actuating and coordinating the operation of the various component parts of the apparatus, and means cooperating with the travelling chain for automatically discharging hangers from said transfer mechanism onto said chain, from said chain onto the hanger holder of the display mechanism, back onto said chain from said hanger holder and back onto said rack from said chain.

The upper structure comprises a center frame 33, a left-hand frame 34, and a right-hand frame 35, said three frames being connected and combined into a rigid structure by two longitudinal bars 36, 37, bolted onto said frames by a number of bolts, such as 38.

The center frame is formed with a forwardly projecting bracket 39 and a rearwardly projecting bracket 40, said bracket 39 providing a support for the moving parts of the display mechanism and the bracket 40 providing a support for the mechanism controlling the feeding and discharging operation of the rack.

The left-hand frame carries a front sprocket wheel 41, a rear sprocket wheel 42, and a deflecting sprocket wheel 43, for the chain 32, said sprocket wheels being rotatably mounted upon studs 44, 45, 46, respectively, vertically depending from said frame. A vertical shaft 47, carrying a sprocket wheel 48, is rotatably mounted through bracket 39 of the center frame, and a sprocket wheel 49 is rotatably mounted on a stud 50, depending from the outer end of the right-hand frame 35, completing the path of travel of endless chain 32.

Continuous movement is imparted to said chain by a motor F, the pulley 51 of which drives another pulley 52, by means of a belt 53, said pulley 52 driving a worm 54, meshing with a worm wheel 55, enclosed within casing 56, carried by bracket 40.

Worm wheel 55 is fixed upon a shaft 57, extending towards the front of the structure and carrying at its front end a conical pinion 58, in mesh with a conical gear wheel 59, carried by shaft 47. Chain 32 is thus arranged for continuous travel at a uniform speed, riding over sprocket wheels 41, 42, 43, 49, 48.

At the upper end of shaft 47 is mounted a pinion 60, meshing with a gear 61, carrying a driving disk 62 of an intermittent gearing, the other element of which is constituted by plate 63, carrying a dog 64, said plate being mounted at the upper end of vertical shaft 65, the lower end of which carries hanger display holder 66. Said gearing is completed by a bi-segmental pinion 67, also carried by shaft 65, said pinion being formed with two diametrically opposite toothed segments, arranged at right angles to the axis of plate 63. Dog 64 is formed with two opposite teeth 68, 69, adapted to be engaged by lugs 70, 71, carried by disk 62, and outwardly projecting therefrom, during the rotation of said disk. When one of said teeth is engaged by one of said lugs it will initiate the rotation of vertical shaft 65 and cause one of the toothed segments of pinion 67 to intermesh with gear wheel 61 and to continue the rotation of shaft 65 for a 180° angle, when plate 63 will once more become engaged by disk 62, so as to temporarily restrain shaft 65 against rotation. When the next lug on disk 62 comes around the operation will be repeated and shaft 65 will be caused to once more rotate an angle of 180°, causing the hanger holder 66 to resume its original position.

The hangers which are suspended from the rack mechanism C are discharged one by one at spaced intervals onto segmental rail 72 of the transfer mechanism and are subsequently carried along said rail by the action of a transfer arm 73, pivotally mounted at 74, onto a bracket 75, inwardly extending from the right-hand frame 35. The reciprocating movement of said transfer arm is controlled by gear wheel 61, an articulated connection 75 being interposed between disk 62 and arm 76, extending from the hub 77 of transfer arm 73, said arm 76 forming a bell crank lever with said arm 73.

Figs. 3, 6, 7, 8 illustrate the position of the various parts mentioned where hanger holder 66 occupies one of its temporary stationary display positions and transfer arm 73 occupies its extreme position corresponding to the discharge of a hanger from rail 72 onto a temporary pivotal support 78 forming part of a device for subsequently transferring said hanger onto the travelling chain. It is obvious that the next half revolution of gear wheel 61 will cause arm 73 to be angularly displaced to its other extreme position in proximity of the point of discharge of the hangers from the rack carrier onto rail 72, so as to engage a hanger previously discharged from the rack carrier, for the next trip.

The movements of the various parts mentioned are so timed that at about the time when a new hanger is discharged from the temporary support 78 onto the travelling chain, the hanger previously suspended for display purposes from hanger holder 66 is re-transferred from said holder onto the travelling chain, to be carried back to the point where said hanger will be once more transferred onto the feed rack.

It will be seen that gear wheel 61 will complete one revolution while shaft 57 will make several revolutions, preferably from four to six, for the purpose of automatically spacing the successive discharge of hangers from the rack onto the segmental rail 72, in a manner which will be hereinafter set forth.

Figures 7, 8, 13, 14, 15:
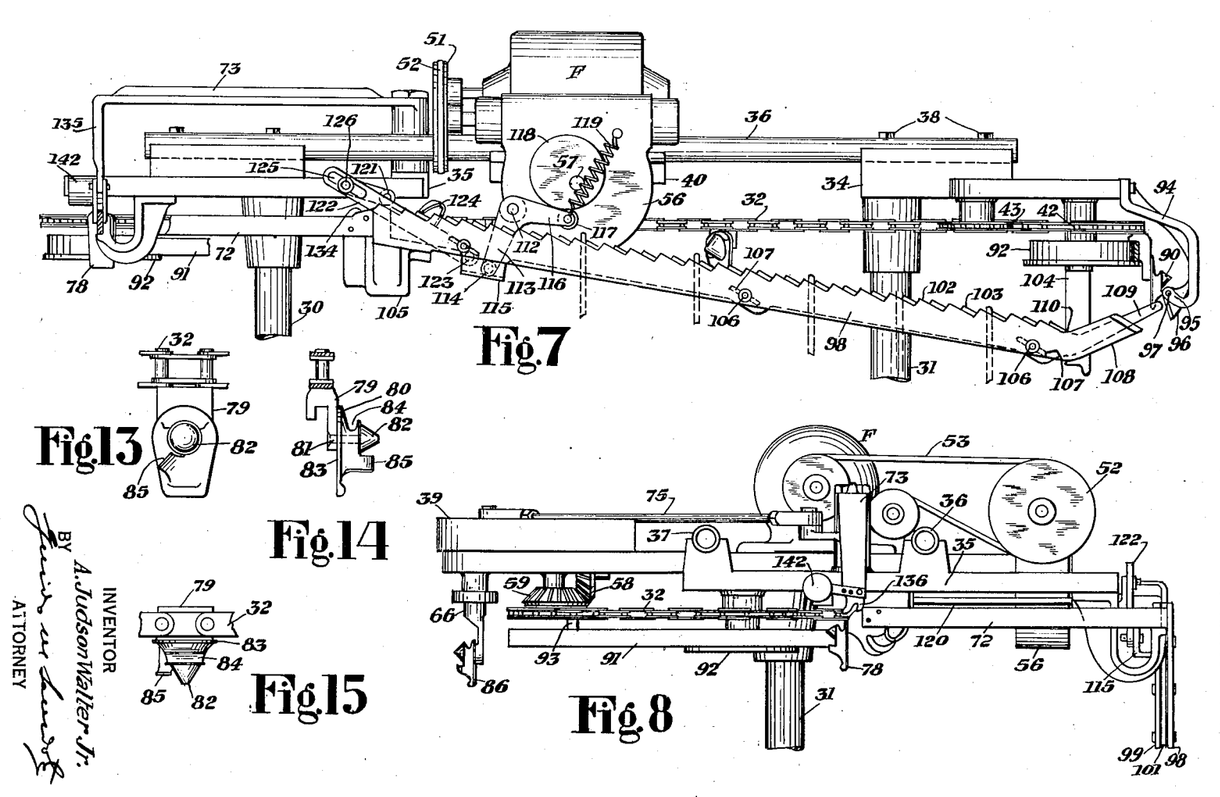
Fig. 7 is a rear view in elevation thereof.
Fig. 8 is an end view in elevation of the same from the right, with respect to Fig. 3.
Fig. 13 is a front view in elevation of a carrying and transferring device which may be used for suspending hanger hooks or the like, and for discharging the same onto or for receiving them from similar devices, adapted to cooperate therewith, by virtue of the translatory movement of one device with respect to another.
Fig. 14 is a side view in elevation thereof.
Fig. 15 is a plan view thereof.
Figure 9:
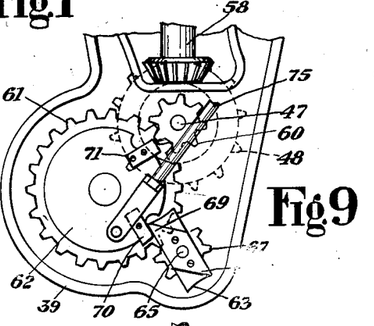
Fig. 9 is a detail plan view of the stationary display mechanism, showing its parts in a position different from that shown in Fig. 3.
Figure 10:
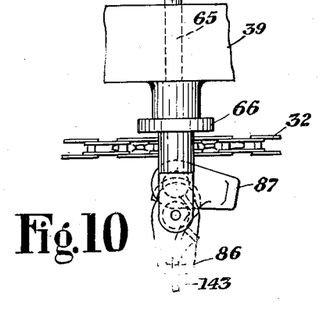
Fig. 10 is a detail front view in elevation thereof, illustrating the manner in which a hanger may be automatically transferred from the travelling carrier to the stationary display holder.

The devices for transferring the hangers from one temporary support to another are illustrated in detail in Figs. 13, 14, 15 and consist essentially of temporary supports mounted to oscillate about a horizontal axis when urged to do so by force being applied to their tip ends. Some of these temporary supports are mounted at a lower level than others, according to the duty which they are expected to perform.

Referring to Figs. 13, 14, 15, it will be seen that each one of these devices consists of a carrier 79, from which is suspended a temporary support 80, mounted to oscillate about a pivot 81, said temporary support extending downwardly from said pivot. Said temporary support comprises a substantially conical portion or button 82, frontwardly extending from the back plate 83, the upper part of said conical portion being notched at right angles to the axis of pivot 81, so as to form a notch 84, adapted to receive and retain the hook of a hanger. Underneath conical button 82, the device is also formed with a frontwardly extending lug 85, arranged at an angle to the vertical, as shown in Fig. 13.

Temporary support 78 at the discharge end of segmental rail 72 is mounted at a level higher than that of temporary support 86, depending from hanger holder 66. Furthermore, the temporary supports carried by the travelling chain are alternately mounted at a level intermediate the levels of supports 78, 86, and at a level lower than that of support 86, temporary supports indicated at 87, 88 being at the intermediate level and temporary supports indicated at 89, 90 being at the lower level. In order to insure a positive action of these temporary supports and at the same time provide a track for the travelling chain, preventing sagging thereof, I provide a rail 91, extending underneath the travelling chain, said rail being supported by flanged drums, such as 92, carried by studs 44, 45, 50, and by a rod 93, downwardly extending from bracket 39. Accordingly, carrier 79 of each temporary support, which is fixed onto chain 32, is formed so as to ride over rail 91, supporting and maintaining the chain in its proper horizontal alinement.

The relative vertical arrangement of said temporary supports, which, cooperating with one another, form the transferring devices, is such that when supports 87, 88 of the chain pass in front of support 78 at the discharge end of the segmental rail, the button portion 82 of said supports 87, 88 will strike against the lug portion 85 of temporary supports 78 and will, therefore, cause said temporary support 78 to swing a certain angle about its respective pivot 81.

The resulting angular displacement of said support 78 in a vertical plane will bring said support to a position where its notch 84 has become disengaged from the hook suspended therefrom, and the hook, therefore, will slide downwardly riding over the conical surface of button 82 and fall into the notch 84 of the temporary support 87 or 88 of the chain at the time engaging support 78. A similar relation exists, but in a reverse sense, between temporary supports 87, 88 of the chain and the temporary support 86 of hanger holder 66.

Figure 1:
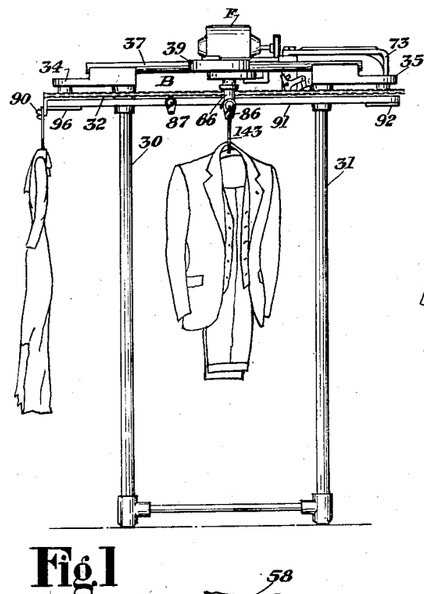
Fig. 1 is a front elevation of a display conveyor, adapted for displaying garments and like articles.
Figures 2, 11:
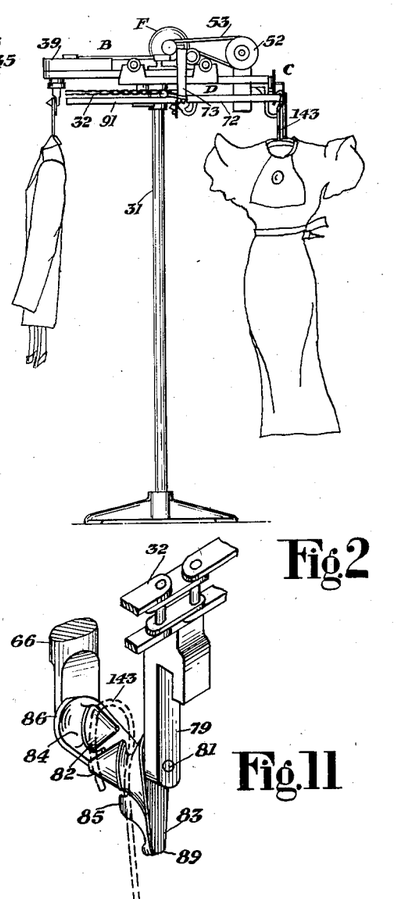
Fig. 2 is a side elevation thereof.
Fig. 11 is a detail view in perspective, illustrating the manner in which a hanger is automatically returned from the stationary holder onto the travelling carrier.
Figure 3:
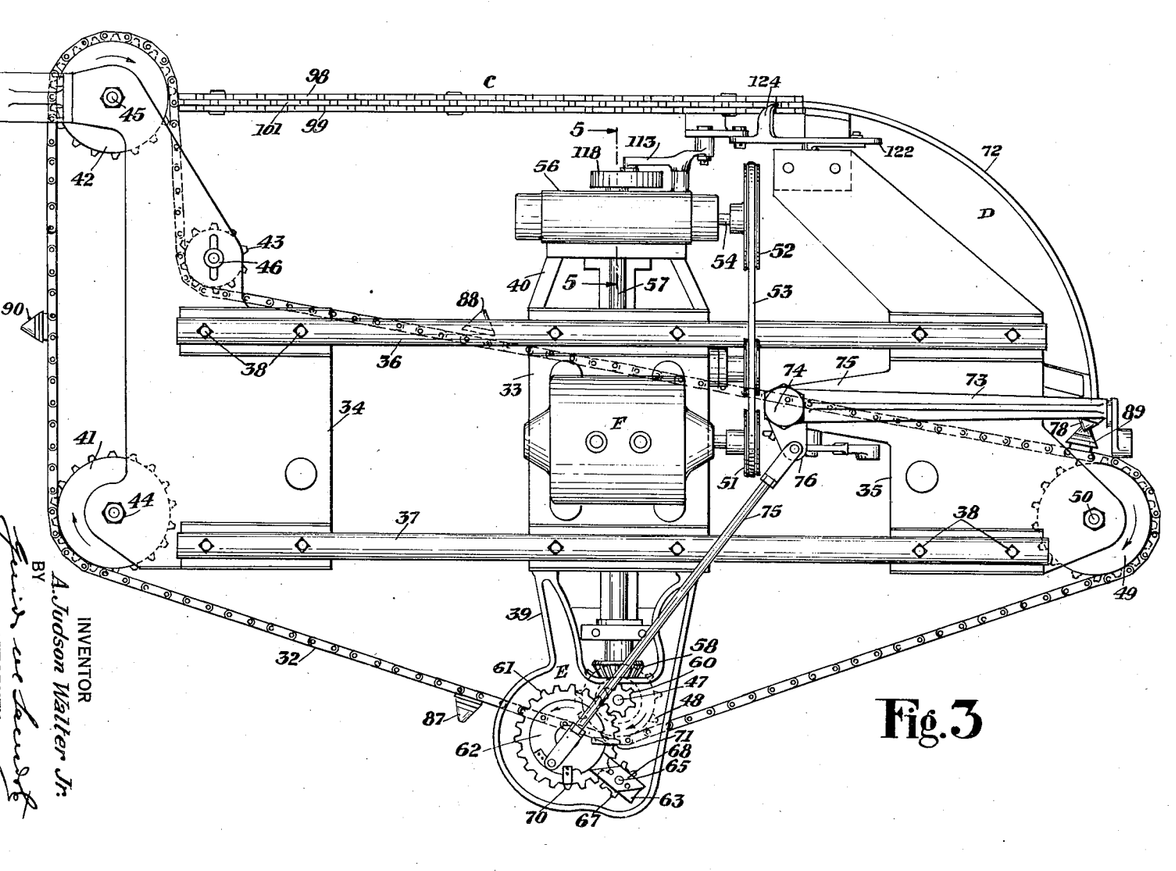
Fig. 3 is a plan view of the same in an enlarged scale.
Figure 4:
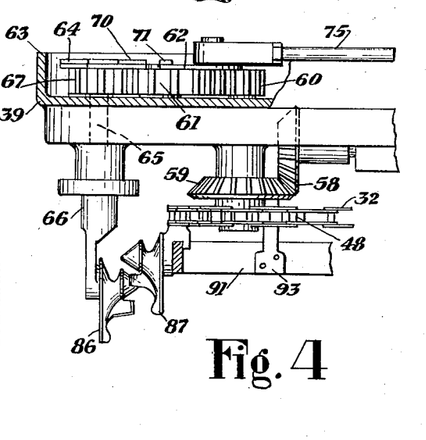
Fig. 4 is a detail side view in elevation of the stationary 2-position display mechanism.
Figures 5, 12:
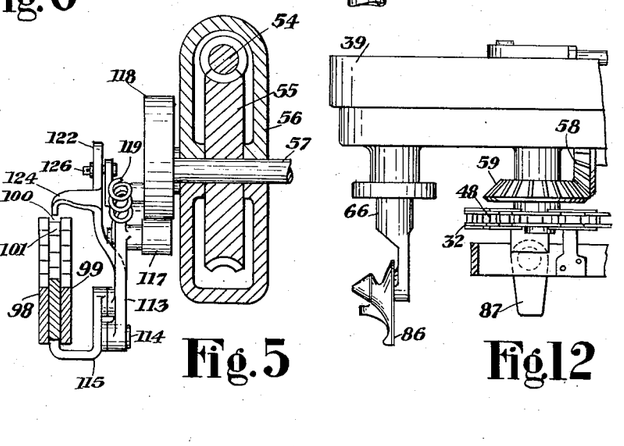
Fig. 5 is a detail vertical transversal section through line 5—5 of Fig. 3.
Fig. 12 is a detail side view in elevation, corresponding to Fig. 4, showing the stationary holder in its other position.
Figure 6:
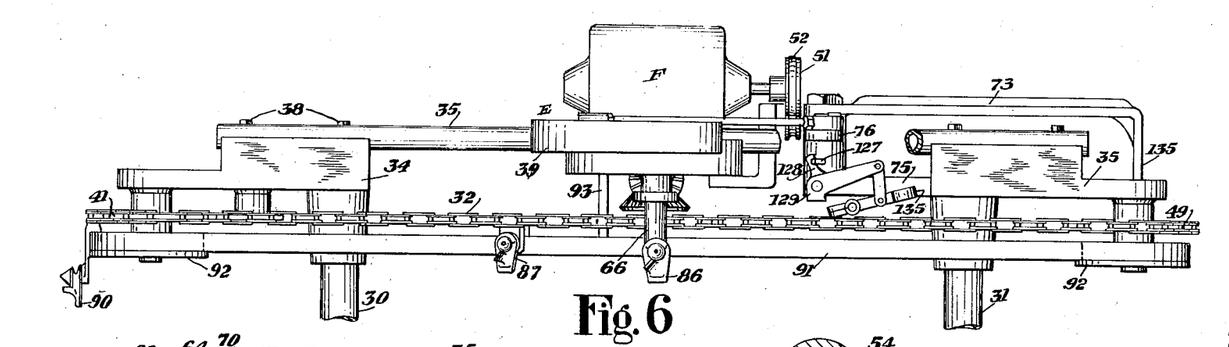
Fig. 6 is a front view in elevation of the upper part of the machine, shown in Fig. 3.

As Fig. 4 clearly shows, the conical button portion of support 86 is about on a level with the lug 85 of temporary supports 87, 88 of the chain, so that when either support 87 or 88 strikes the button portion of support 86, said support 87 or 88 is caused to oscillate about its horizontal pivot and to discharge the hanger carried thereby onto support 86.

In a similar manner the conical button portion of supports 89, 90 is about on a level with the lug 85 of temporary support 86 of hanger holder 66, so that when either support 89 or 90 reaches support 86, said support 86 will thereby be caused to swing about its pivot and to discharge the hanger carried thereby onto the travelling support 89 or 90. From the rear end of frame 34, in correspondence of stud 45, is provided a depending bracket 94, the lower end of which is inwardly and upwardly turned, as shown at 95, forming a forked support for a transfer member 96, pivotally mounted at 97, the upper end of said forked support being directly in the path of lug 85 of lower temporary supports 89, 90, carried by the chain.

By virtue of this arrangement, when either temporary support 89 or 90 passes across forked support 95, it will be tilted a certain angle and will be caused to discharge the hanger carried thereby onto the upper edge of transfer member 96.

It is thus seen that a hanger originally discharged from rail 72 onto temporary support 78 is subsequently discharged to a lower lever by said temporary support to either support 87 or 88, is then discharged thereby to a still lower level onto support 86, then to a still lower lever from support 86 to either support 89 or 90, and then to a still lower level from either support 89 or 90 onto transfer member 96. In the meantime, during the interval between the time when a hanger is discharged from the chain onto display support 86 and the time when said hanger is redischarged from said display support 86 onto the chain, the hanger holder 66 carrying display support 86 is successively rotated 180° from the position shown in Fig. 4 to the position shown in Fig. 8, and then back again after a certain interval to the position of Fig. 4. Therefore, first the front and then the back of the garment carried by the hanger will be displayed, while said garment and hanger are held virtually stationary before being once more carried away by the chain.

It will be observed that the operation of the transferring devices described is entirely automatic, taking place purely by virtue of the translatory movement of the endless carrier, or chain 32, without the intermediary of any other controlling or actuating mechanism.

The garments which have thus been brought to and displayed at the front of the device and which have subsequently been once more carried away by the travelling carrier and discharged onto transfer member 96, are returned by said transfer member to a feeding or distributing carrier at the rear to be eventually returned to rail 72 in a continuous cycle.

The feeding or distributing carrier, which also acts as a storage carrier upon which a number of hangers can be placed at random when the operation of the device is first started, has the double object of returning the hangers from the lowermost discharge level to the uppermost level of discharge of said hangers onto rail 72 and determining the successive discharge of said hangers onto rail 72 at regularly spaced intervals, timed with the operation of transfer arm 73.

The feeding or distributing carrier consists of a stationary inclined rack having a saw-toothed upper edge, extending between a point in proximity of transfer member 96 and the rear end of rail 72, and a reciprocating feeding member also provided with a saw-toothed upper edge, cooperating therewith.

The stationary rack consists of two flat bars 98, 99, set edgewise and spaced from each other to provide a clearance space 100, within which is housed the feeding member 101. The two bars 98, 99 are formed with an upper saw-toothed edge 102 and the feeding bar 101 is similarly formed with a saw-toothed edge 103, which registers with saw-toothed edge 102, when, or a little before, said feeding bar 101 reaches its rearmost position.

Bar 98 is held in position by a bracket 104, at the right, and by a bracket 105 at the left, with respect to Fig. 7. Bar 99 is fixed and positioned with respect to bar 98 by longitudinally spaced spacing rivets, such as 106. In correspondence of said rivets, feeding bar 101 is provided with inclined slots, such as 107, which cause said feeding bar to be raised or lowered when reciprocated in a longitudinal direction.

At the rear bars 98, 99 are formed with an upwardly inclined extension 108, the outer end of which is spaced a certain distance from transfer member 96, as shown in Fig. 7. Feeding bar 101 is also formed at the rear with an upwardly inclined extension 109, the outer end of which remains spaced from transfer member 96 a distance sufficient to clear temporary support 89 or 90 when either support passes across forked support 95, at which times feeding bar 101 is at or about its foremost position. When said feeding bar is moved to its rearmost position, the outer end of extension 109 strikes against the lower end of transfer member 96, as shown in dotted lines in Fig. 16, and causes said transfer member to tilt in a counterclockwise direction a certain angle sufficient for a hanger suspended from the upper edge thereof to be discharged onto the upper edge of extension 109.

When, at the end of the next forward stroke, the feeding bar is brought to a position where the upper edge of extension 109 registers with or is a little higher than the upper edge of extensions 108, the hanger suspended from extension 109 will slide down the upper edge of extensions 108 to the lowermost notch 110 of the upper edge of bars 98, 99.

The reciprocating motion imparted to feeding bar 101 will cause the same to engage the hangers suspended from the notches of bars 98, 99, when said feeding bar reaches its rearmost position and to carry them forward one step while said feeding bar is moved to its foremost position, causing them to fall into the next notch of said bars 98, 99.

The reciprocating motion of feeding bar 101 is produced by means of a crank lever 111, which is pivotally mounted at 112 to the rear surface of casing 56, said crank lever having an arm 113, pivotally connected at 114, to a U-shaped bracket 115, laterally extending from feeding bar 101 at a point in proximity of its forward end. Said crank lever also has an arm 116 carrying a roller 117, urged to bear against the peripheral surface of an eccentric 118, carried by shaft 57, by a spring 119. By virtue of this arrangement, it is obvious that eccentric 118 causes the forward movement of the feeding bar while spring 119 causes the return movement thereof.

For the device to be operative it is necessary that the discharge of the hangers from the feeding rack onto rail 72 be timed with the operation of the endless carrier, so that a new hanger is discharged onto rail 72 for each hanger discharged onto and displayed by temporary display support 86. On the other hand, as stated, a number of hangers can be placed at random upon rack 98—99 without any particular attention being paid to their proper spacing.

Suitable devices are, therefore, provided for controlling the feeding and discharging operations of feeding bar 101. These devices comprise a transversal shaft 120, extending to the rear of frame 35 and carrying at its rear end an arm 121, a link 122, pivotally connected at 123 to the front end of the U-shaped bracket 115, a hook 124 integral with said link, and means controlled by the operation of the transfer arm 73 for rocking shaft 120 at predetermined intervals.

Figures 16, 17, 18, 19, 20, 21, 22:
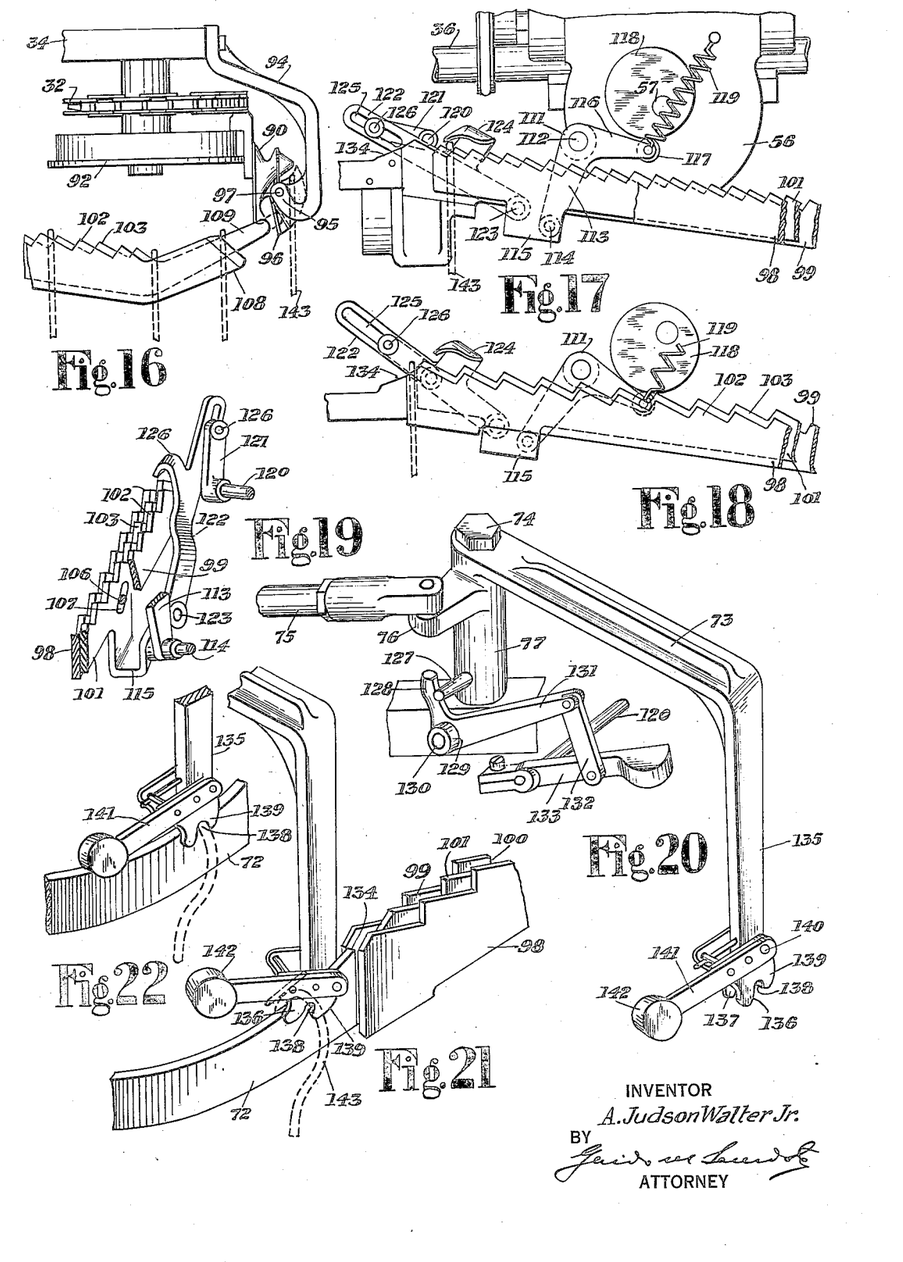
Fig. 16 is a detail rear view in elevation of the devices for transferring hangers from the travelling carrier onto a temporary support and from the latter onto the feeding or distributing carrier.
Fig. 17 is a detail rear view in elevation, illustrating the mechanism controlling the operation of the feeding and distributing carrier.
Fig. 18 is a similar view with various parts in a different position.
Fig. 19 is a detail view in perspective of the parts of the mechanism shown in Fig. 17.
Fig. 20 is a detail view in perspective, showing the transfer arm and parts governing the operation of the feeding carrier, controlled thereby.
Fig. 21 is a detail view in perspective of the outer end of the transfer arm, showing said arm about to engage the hook of a hanger to be moved along the auxiliary rail.
Fig. 22 is a similar view, showing the transfer arm after the hanger hook has been engaged thereby.

The tip end of hook 124 is normally somewhat below the level of the path of bars 98, 99, so that when a hanger happens to be suspended from the first frontward notch of bars 98, 99, as shown in Fig. 17, at a certain point during the return stroke of feeding bar 101, the tip end of hook 124 will strike against said hanger and will prevent said feeding bar from completing its return stroke. So long as this condition persists the feeding bar will be prevented from moving back far enough to engage the hangers suspended from bars 98, 99 and therefore no advance movement of said hangers will take place. The forward end of link 122 is formed with a slot 125, through which is inserted a pin 126, carried by the tip end of arm 121. If arm 121 is tilted upwardly, link 122 will, therefore, also be angularly displaced in an upward direction, as shown in Fig. 18, so that the tip end of hook 124 will now be free to clear the hanger suspended from the foremost notch of bars 98, 99. When this takes place the feeding bar is free to continue its return stroke, so that at its next forward stroke said hanger will be carried forward one step and discharged onto rail 72.

It is to be understood that when there is no hanger suspended from the frontward notch of bars 98, 99, the feeding bar 101 will be free to complete its return stroke even though link 122 may occupy its lowermost position.

The rocking movement of shaft 120 and arm 121 carried thereby, to raise link 122, is caused to take place each time that transfer arm 73 reaches the end of its transfer stroke. To this end, a pin 127, projecting from hub 77 of arm 73, is caused to strike arm 128 of a crank lever 129, pivoted on a horizontal pivot 130, when transfer arm 73 reaches its extreme position, shown in Fig. 3, as Fig. 20 clearly shows. Crank lever 129 will thus be tilted a certain angle in a counterclockwise direction and its arm 131, connected by a link 132 to a lever 133, fixed onto the front end of shaft 120, will cause a certain angular movement of said lever and shaft, resulting in the tilting movement of arm 121 necessary to raise link 122, so that hook 124 will clear the hanger suspended from the frontward notch of bars 98, 99.

By virtue of this arrangement, the feeding bar will be operative until such time when a hanger will have reached the forward notch of bars 98, 99, and will then become inoperative until said hanger will have been discharged onto rail 72, when feeding bar 101 will once more become operative. The feeding bar will, therefore, act as an automatic spacing means regulating the proper feeding of the hangers to rail 72.

When transfer arm 73 is brought back to its rearmost position it will engage the hanger previously discharged onto the rear end of rail 72 and will carry it to the front where it is discharged onto temporary support 78. It will be observed that the rear end of rail 72 has the surface of its upper edge slightly inclined to meet the upper edge of bars 98, 99, as shown at 134, in Figs. 7 and 21. This upwardly inclined surface offers a resistance to the rearward movement of a hanger suspended from rail 72 after it has been discharge thereon from rack 98—99.

Such resistance is utilized in order to facilitate the engagement of said hanger by the transfer arm at the end of its return movement. The outer end of said transfer arm is bent downwardly, as shown at 135, and carries at its tip or lower end a hanger engaging device, consisting of two notched plates 136, 137, embracing the top of rail 72, said notched plates being each provided with a notch 138, adapted to engage the hook of a hanger suspended from rail 72. Said notched plates have a slanted rear end 139 and are pivotally mounted onto the lower end of part 135 of arm 73, so as to be tiltable about a transversal pivot 140, together with an arm 141, carrying at its outer end a counterweight 142. When transfer arm 73 is about to reach the end of its rearward stroke, as shown in Fig. 21, slanted surface 139 of plates 136, 137 will ride over the top of hanger hook 143, causing said plates 136, 137 to tilt upwardly until notch 138 has passed beyond said hook; said hook being in the meantime prevented from sliding backward by the upwardly inclined edge surface 134.

As soon as notch 138 has passed beyond hook 143, counterweight 142 will cause arm 141 to fall back together with plates 136, 137, so that hanger hook 143 will become imprisoned between the upper edge of rail 72 and notch 138 of said plates 136, 137. Transfer arm 73 now resuming its forward stroke, will carry the hanger engaged thereby to the extreme front end of rail 72, where it is discharged onto temporary support 78, in the manner previously described.

Although the drawings illustrate an apparatus especially designed for display purposes, it is obvious that several of its novel features can be applied in connection with conveying apparatus used for other purposes.

The drawings will, therefore, be understood as being intended for illustrative purposes only and not in a limiting sense. I accordingly reserve the right to carry my invention into practice in all those ways and manners which may enter, fairly, into the scope of the appended claims.

I claim:

1. In apparatus of the character described, an article holder comprising an attaching member and a suspension and delivery member depending therefrom, said suspension and delivery member being mounted so as to be oscillatable about a substantially horizontal axis, and having a frontwardly extending head portion having a slanting surface, substantially on a level with said axis, and a tail portion depending therefrom, the upper part of said head having a transversal depression adapted to receive and retain a bent wire member suspended therefrom.

2. In apparatus of the character described, comprising a carrier and a support, at least one of said two elements being arranged for translatory motion with respect to the other, means for suspending and transferring an article holder from one of said two elements onto the other, comprising a delivery member depending from one of said two elements, mounted so as to be oscillatable about a substantially horizontal axis, and a receiving member, mounted on the other element, having a part projecting in the plane of said delivery member, at a point vertically spaced from its point of attachment, the reaction of said projecting part against said delivery member causing it to swing to a position where an article holder suspended therefrom will be free to slide to a lower level onto said receiving member.

3. In apparatus of the character described, comprising a carrier and a support, at least one of said two elements being arranged for translatory motion with respect to the other, means for suspending and transferring an article holder from one of said two elements onto the other, comprising a delivery member depending from one of said two elements, mounted so as to be oscillatable about a substantially horizontal axis, and a receiving member, mounted on the other element, having a part projecting in the plane of said delivery member, at a point vertically spaced from its point of attachment, the reaction of said projecting part against said delivery member causing it to swing to a position where an article holder suspended therefrom will be free to slide to a lower lever onto said receiving member, said receiving member also being mounted on said support so as to be capable of angular displacement about a substantially horizontal axis, for eventual redelivery of said article holder to another receiving member.

4. In apparatus of the character described, a plurality of transfer devices for suspending an article holder and for transferring it from one device to another at a lower level, at least part of said devices being arranged for translatory motion with respect to the others, each device comprising a member mounted so as to be oscillatable about a substantially horizontal axis, said member having a substantially conical projecting head concentric to said axis, and a tail portion depending therefrom, the head of the oscillatable member of one device projecting in the plane of the tail portion of another, the upper part of each head having a transversal depression adapted to receive and retain a bent wire member suspended therefrom, the reaction of the head of one member against the tail portion of another causing the latter to swing to a position where an article holder suspended therefrom will be free to slide onto the depression of said head.

5. In apparatus of the character described, a travelling carrier, a non-travelling support, a plurality of transfer devices each comprising a member mounted so as to be oscillatable about a substantially horizontal axis, depending from said carrier, the oscillatable member of some of said devices being mounted at an upper and some at a lower level, and a member mounted on said support at an intermediate level, so as to be oscillatable about a substantially horizontal axis, the latter member having a part projecting in the path of travel of the upper level members depending from said carrier, at a point vertically spaced from their respective points of attachment, and the lower level members each having a part projecting in the plane of said member depending from said support, at a point vertically spaced from its point of attachment, the reaction of said projecting parts against said upper and intermediate level members causing the same to swing to a position where an article holder suspended therefrom will be free to slide to a lower level onto said projecting parts.

6. In apparatus of the character described, a travelling carrier, a non-travelling support, a plurality of transfer devices each comprising a member mounted so as to be oscillatable about a substantially horizontal axis, depending from said carrier, the oscillatable member of some of said devices being mounted at an upper and some at a lower level, a member mounted on said support at an intermediate level, so as to be oscillatable about a substantially horizontal axis, the latter member having a part projecting in the path of travel of the upper level members depending from said carrier, at a point vertically spaced from their respective points of attachment, and the lower level members each having a part projecting in the plane of said member depending from said support, at a point vertically spaced from its point of attachment, the reaction of said projecting parts against said upper and intermediate level members causing the same to swing to a position where an article holder suspended therefrom will be free to slide to a lower level onto said projecting parts, and means for rotating said support a certain angle about a substantially vertical axis, after an article holder has been transferred onto its oscillatable member from one of said upper level members, and for returning said support to its original position, before one of said lower level members reaches the position where said article holder can be redischarged from said oscillatable member onto said lower level member.

7. In apparatus of the character described, a travelling carrier, a non-travelling support, a plurality of transfer devices each comprising a member mounted so as to be oscillatable about a substantially horizontal axis, depending from said carrier, the oscillatable member of some of said devices being mounted at an upper and some at a lower level, a member mounted on said support at an intermediate level, so as to be oscillatable about a substantially horizontal axis, the latter member having a part projecting in the path of travel of the upper level members depending from said carrier, at a point vertically spaced from their respective points of attachment, and the lower level members each having a part projecting in the plane of said member depending from said support, at a point vertically spaced from its point of attachment, the reaction of said projecting parts against said upper and intermediate level members causing the same to swing to a position where an article holder suspended therefrom will be free to slide to a lower level onto said projecting parts, and means for redischarging said article holder from the lower level member from which it is suspended, and for returning it onto one of said upper level members.

8. In apparatus of the character described, a travelling carrier, a non-travelling support, a plurality of transfer devices each comprising a member mounted so as to be oscillatable about a substantially horizontal axis, depending from said carrier, the oscillatable member of some of said devices being mounted at an upper and some at a lower level, a member mounted on said support at an intermediate level, so as to be oscillatable about a substantially horizontal axis, the latter member having a part projecting in the path of travel of the upper level members depending from said carrier, at a point vertically spaced from their respective points of attachment, and the lower level members each having a part projecting in the plane of said member depending from said support, at a point vertically spaced from its point of attachment, the reaction of said projecting parts against said upper and intermediate level members causing the same to swing to a position where an article holder suspended therefrom will be free to slide to a lower level onto said projecting parts, means for rotating said support a certain angle about a substantially vertical axis, after an article holder has been transferred onto its oscillatable member from one of said upper level members, and for returning said support to its original position, before one of said lower level members reaches the position where said article holder can be redischarged from said oscillatable member onto said lower level member, and means for redischarging said article holder from the lower level member from which it is suspended, and for returning it onto one of said upper level members.

9. In apparatus of the character described, the combination, with a travelling carrier having a plurality of transfer devices each comprising an article holder supporting member, some of said members being mounted at an upper and some at a lower level, of a return carrier for receiving article holders discharged from said lower level supporting members, and for delivering said holders to said upper level supporting members, said return carrier comprising a stationary saw-toothed rack member, and a reciprocating saw-toothed rack member causing said holders to advance step by step along said stationary rack member.

10. In apparatus of the character described, the combination, with a traveling carrier having a plurality of transfer devices each comprising an article holder supporting member, some of said members being mounted at an upper and some at a lower level, of a return carrier for receiving article holders discharged from said lower level supporting members, and for delivering said holders to said upper level supporting members, said return carrier comprising means for supporting a plurality of article holders, and means for gradually advancing said article holders from the receiving to the delivery end of said return carrier.

11. In apparatus of the character described, the combination, with a traveling carrier having a plurality of transfer devices each comprising an article holder supporting member, some of said members being mounted at an upper and some at a lower level, of a return carrier for receiving article holders discharged from said lower level supporting members, and for delivering said holders to said upper level supporting members, said return carrier comprising means for supporting a plurality of article holders, means for gradually advancing said article holders from the receiving to the delivery end of said return carrier, and means for regulating the discharge of said article holders from said return carrier at predetermined spaced intervals, timed with the operation of said traveling carrier.

12. In apparatus of the character described, a feeding and distributing carrier comprising a magazine suspension member, a feeding member adapted to cause a step by step advance of article holders suspended from said suspension member, and means regulating the operation of said feeding member so as to space deliveries effected thereby from the discharge end of said suspension member, independently of the relative positions occupied by the article holders suspended from said suspension member.

13. In apparatus of the character described, a traveling carrier, a feeding and distributing carrier comprising a magazine suspension member and a feeding member adapted to cause a step by step advance of article holders suspended from said suspension member, means for transferring article holders from said suspension member onto said traveling carrier, means for retransferring said article holders from said traveling carrier onto said suspension member at the receiving end thereof, and means for regulating the operation of said feeding member so as to space deliveries effected thereby from the discharge end of said suspension member at intervals timed with the operation of said traveling carrier, independently of the relative positions occupied by the article holders suspended from said suspension member.

14. In apparatus of the character described, a feeding and distributing carrier comprising a stationary saw-toothed rack member, a reciprocating saw-toothed rack member adapted to cause article holders suspended from said stationary rack member to advance step by step in the feeding direction, a cam-acting member causing movement of said reciprocating member in the feeding direction, a spring causing return movement thereof, a restraining member associated with said reciprocating rack member, adapted to abut against one of said article holders when said holder has reached a predetermined position close to the discharge end of said stationary rack member, and to prevent full completion of the return movements of said reciprocating rack member, thereby preventing the same from engaging and advancing said article holders, and means for at times displacing said restraining member to clear the article holder against which it abuts, thereby enabling said reciprocating member to complete its next return stroke.

15. In apparatus of the character described, a traveling carrier, a feeding and distributing carrier comprising a stationary saw-toothed rack member, a reciprocating saw-toothed rack member adapted to cause article holders suspended from said stationary rack member to advance step by step in the feeding direction, means for transferring article holders discharged from said stationary rack member onto said traveling carrier, means for retransferring said article holders from said traveling carrier onto said stationary rack member at the receiving end thereof, a cam-acting member operatively associated with said traveling carrier, causing movement of said reciprocating member in the feeding direction, a spring causing return movement thereof, a restraining member associated with said reciprocating rack member, adapted to abut against one of said article holders when said article holder has reached a predetermined position close to the discharge end of said stationary rack member, and to prevent full completion of the return movements of said reciprocating rack member, thereby preventing the same from engaging and advancing said article holders, and means, timed with the operation of said traveling carrier, for at times displacing said restraining member to clear the article holder against which it abuts, thereby enabling said reciprocating member to complete its next return stroke.

16. In apparatus of the character described, a traveling carrier, a feeding and distributing carrier comprising a magazine suspension member and a feeding member adapted to gradually advance article holders suspended from said suspension member towards the discharging end thereof, a transfer rail interposed between said discharging end and said traveling carrier, and a transfer member, riding over said rail, comprising an engaging member adapted to slide over an article holder recently discharged from said suspension member onto said rail, during the return movement of said transfer member, and to engage and advance said article holder along said rail, during the next forward stroke of said transfer member.

17. In apparatus of the character described, a traveling carrier, a non-traveling rotatable support, means for transferring article holders from said carrier onto said support, means for retransferring said article holders from said support onto said carrier, means for at times rotating said support for displaying in different positions articles suspended therefrom, a feeding and distributing carrier comprising a magazine suspension member and a feeding member adapted to cause a step by step advance of article holders suspended from said suspension member, means for transferring article holders from said suspension member onto said traveling carrier, means for retransferring said article holders from said traveling carrier onto said suspension member at the receiving end thereof, and means for regulating the operation of said feeding member so as to space deliveries effected thereby from the discharge end of said suspension member at intervals timed with the operation of said traveling carrier, independently of the relative positions occupied by the article holders suspended from said suspension member.

18. In apparatus of the character described, a traveling carrier, a non-traveling rotatable support, means for transferring article holders from said carrier onto said support, means for retransferring said article holders from said support onto said carrier, means for at times rotating said support for displaying in different positions articles suspended therefrom, a feeding and distributing carrier comprising a magazine suspension member and a feeding member adapted to gradually advance article holders suspended from said suspension member towards the discharging end thereof, a transfer rail interposed between said discharging end and said traveling carrier, a transfer member, riding over said rail, comprising an engaging member adapted to slide over an article holder recently discharged from said suspension member onto said rail, during the return movement of said transfer member, and to engage and advance said article holder along said rail, during the next forward stroke of said transfer member, means for transferring said article holder from said rail onto said traveling carrier, and means for retransferring said article holders from said traveling carrier onto said suspension member at the receiving end thereof.

19. In apparatus of the character described, a traveling carrier, a non-traveling rotatable support, means for transferring article holders from said carrier onto said support, means for retransferring said article holders from said support onto said carrier, means for at times rotating said support for displaying in different positions articles suspended therefrom, a feeding and distributing carrier comprising a magazine suspension member and a feeding member adapted to gradually advance article holders suspended from said suspension member towards the discharging end thereof, a transfer rail interposed between said discharging end and said traveling carrier, a transfer member, riding over said rail, comprising an engaging member adapted to slide over an article holder recently discharged from said suspension member onto said rail, during the return movement of said transfer member, and to engage and advance said article holder along said rail, during the next forward stroke of said transfer member, means for transferring said article holder from said rail onto said traveling carrier, means for retransferring said article holders from said traveling carrier onto said suspension member at the receiving end thereof, and means for regulating the operation of said feeding member so as to space deliveries effected thereby from the discharge end of said suspension member at intervals timed with the operation of said traveling carrier, independently of the relative positions occupied by the article holders suspended from said suspension member.

20. In apparatus of the character described, a traveling carrier, a non-traveling rotatable support, means for transferring article holders from said carrier onto said support, means for retransferring said article holders from said support onto said carrier, means for at times rotating said support for displaying in different positions articles suspended therefrom, a feeding and distributing carrier comprising a stationary saw-toothed rack member, a reciprocating saw-toothed rack member adapted to cause article holders suspended from said stationary rack member to advance step by step in the feeding direction, a transfer rail interposed between the discharging end of said stationary rack member and said traveling carrier, a transfer member, riding over said rail, comprising an engaging member adapted to slide over an article holder recently discharged from said suspension member onto said rail, during the return movement of said transfer member, and to engage and advance said article holder along said rail, during the next forward stroke of said transfer member, means for transferring said article holder from said rail onto said traveling carrier, means for retransferring said article holders from said traveling carrier onto said suspension member at the receiving end thereof, a cam-acting member operatively associated with said traveling carrier, causing movement of said reciprocating member in the feeding direction, a spring causing return movement thereof, a restraining member associated with said reciprocating rack member, adapted to abut against one of said article holders when said article holder has reached a predetermined position close to the discharge end of said stationary rack member, and to prevent full completion of the return movements of said reciprocating rack member, thereby preventing the same from engaging and advancing said article holders, and means, timed with the operation of said traveling carrier, for at times displacing said restraining member to clear the article holder against which it abuts, thereby enabling said reciprocating member to complete its next return stroke.

A. JUDSON WALTER, Jr.